United States Patent
Kuan et al.

(10) Patent No.: US 7,289,465 B2
(45) Date of Patent: Oct. 30, 2007

(54) DETERMINING THE STATE OF A STATION IN A LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet, Inc., Mountain View, CA (US)

( * ) Notice: Subject to any disclaimer, the term of this patent is extended or adjusted under 35 U.S.C. 154(b) by 1040 days.

(21) Appl. No.: 10/408,013

(22) Filed: Apr. 3, 2003

(65) Prior Publication Data

US 2003/0189908 A1    Oct. 9, 2003

Related U.S. Application Data

(60) Provisional application No. 60/370,996, filed on Apr. 8, 2002.

(51) Int. Cl.
*H04Q 7/00* (2006.01)

(52) U.S. Cl. ............ 370/328; 370/338; 370/312; 370/352; 455/41.2; 455/411; 455/426.2; 455/461

(58) Field of Classification Search ........... 370/328, 370/338, 312, 352; 455/426.2, 411, 414.1
See application file for complete search history.

(56) References Cited

U.S. PATENT DOCUMENTS

| | | | | |
|---|---|---|---|---|
| 5,844,900 A * | 12/1998 | Hong et al. | ............. | 370/342 |
| 6,058,106 A * | 5/2000 | Cudak et al. | ............. | 370/313 |
| 6,088,591 A * | 7/2000 | Trompower et al. | ......... | 455/438 |
| 6,259,898 B1 * | 7/2001 | Lewis | ............. | 455/103 |
| 6,345,043 B1 * | 2/2002 | Hsu | ............. | 370/324 |
| 6,556,827 B1 * | 4/2003 | Oh | ............. | 455/426.2 |
| 6,577,609 B2 * | 6/2003 | Sharony | ............. | 370/312 |
| 6,675,012 B2 * | 1/2004 | Gray | ............. | 455/423 |
| 6,732,163 B1 * | 5/2004 | Halasz | ............. | 709/220 |
| 6,771,962 B2 * | 8/2004 | Saifullah et al. | ........... | 455/436 |
| 6,839,331 B2 * | 1/2005 | Rudnick | ............. | 370/312 |
| 6,895,255 B1 * | 5/2005 | Bridgelall | ............. | 455/552.1 |
| 6,947,761 B2 * | 9/2005 | Hutcheson et al. | ......... | 455/518 |
| 7,039,021 B1 * | 5/2006 | Kokudo | ............. | 370/310 |
| 7,039,027 B2 * | 5/2006 | Bridgelall | ............. | 370/329 |
| 7,050,452 B2 * | 5/2006 | Sugar et al. | ............. | 370/465 |
| 7,167,484 B2 * | 1/2007 | Liang et al. | ............. | 370/445 |
| 2002/0049567 A1 | 4/2002 | Vataja | | |
| 2002/0136184 A1 | 9/2002 | Liang et al. | | |

(Continued)

OTHER PUBLICATIONS

Shiann-Tsong Sheu et al., "Dynamic Access Point Approach (DAPA) for IEEE 802.11 Wireless LANs", IEEE 1999, vol. 5, pp. 2646-2650.

(Continued)

*Primary Examiner*—Marceau Milord
(74) *Attorney, Agent, or Firm*—Blakely, Sokoloff, Taylor & Zafman LLP

(57) ABSTRACT

In a wireless local area network, transmissions exchanged between a station and an access point is received using a detector located adjacent to the station. The received transmissions are analyzed to determine the state of the station, where the state of the station indicates whether the station has authenticated and/or associated with the access point in the wireless local area network.

35 Claims, 4 Drawing Sheets

U.S. PATENT DOCUMENTS

2003/0050068 A1   3/2003   Woxberg et al.
2003/0059039 A1   3/2003   Meyerson et al.

OTHER PUBLICATIONS

Supplementary European Search Report mailed Jun. 13, 2006, for European application No. 03719629, filed Apr. 3, 2003, 2 pages.

Graham, Robert (Apr. 15, 2000) "Sniffing (network wiretap, sniffer) FAQ," downloaded from www.robertgraham.com/pubs/sniffing-faq.html, 46 pages.

International Preliminary Examination Report mailed on Dec. 16, 2003, for PCT patent application No. PCT/US03/10626 filed Apr. 3, 2003, 4 pages.

* cited by examiner

DETERMINING THE STATE OF A STATION IN A LOCAL AREA NETWORK

CROSS REFERENCE TO RELATED APPLICATION

This application claims the benefit of an earlier filed provisional application U.S. Provisional Application Ser. No. 60/370,996, entitled DETERMINING THE STATE OF A STATION IN A LOCAL AREA NETWORK, filed on Apr. 8, 2002, the entire content of which is incorporated herein by reference.

BACKGROUND

1. Field of the Invention

The present invention generally relates to wireless local area networks. More particularly, the present invention relates to determining the state of a station in a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

In accordance with the IEEE 802.11 standard, a station is authenticated and associated with an access point in the WLAN before obtaining service from the access point. During this authentication and association process, the station proceeds through 3 stages or states (i.e., State 1, State 2, and State 3). In State 1, the station is unauthenticated and unassociated. In state 2, the station is authenticated but unassociated. In State 3, the station is authenticated and associated. If a station is having difficulty obtaining service from an access point, determining the state of the station can assist in trouble shooting the problem.

SUMMARY

In one embodiment of the present invention, in a wireless local area network, transmissions exchanged between a station and an access point is received using a detector located adjacent to the station. The received transmissions are analyzed to determine the state of the station, where the state of the station indicates whether the station has authenticated and/or associated with the access point in the wireless local area network.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
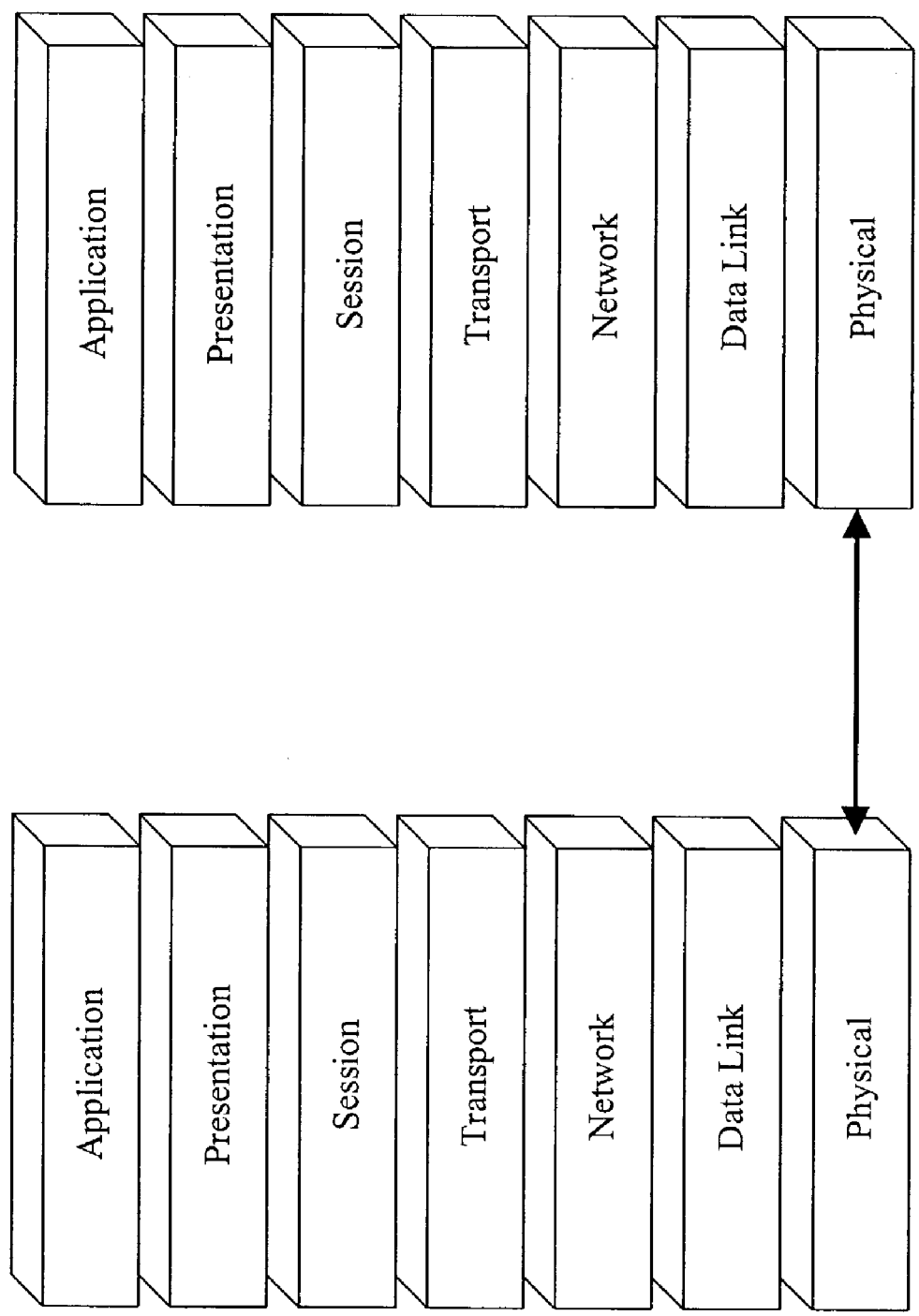
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include a physical layer corresponding to layer 1, a data link layer corresponding to layer 2, a network layer corresponding to layer 3, a transport layer corresponding to layer 4, a session layer corresponding to layer 5, a presentation layer corresponding to layer 6, and an application layer corresponding to layer 7. Each layer in the OSI model only interacts directly with the layer immediately above or below it.

As depicted in FIG. 1, different computers can communicate directly with each other only at the physical layer. However, different computers can effectively communicate at the same layer using common protocols. For example, one computer can communicate with another computer at the application layer by propagating a frame from the application layer through each layer below it until the frame reaches the physical layer. The frame can then be transmitted to the physical layer of another computer and propagated through each layer above the physical layer until the frame reaches the application layer of that computer.

The IEEE 802.11 standard for wireless local area networks ("WLANs") operates at the data link layer, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
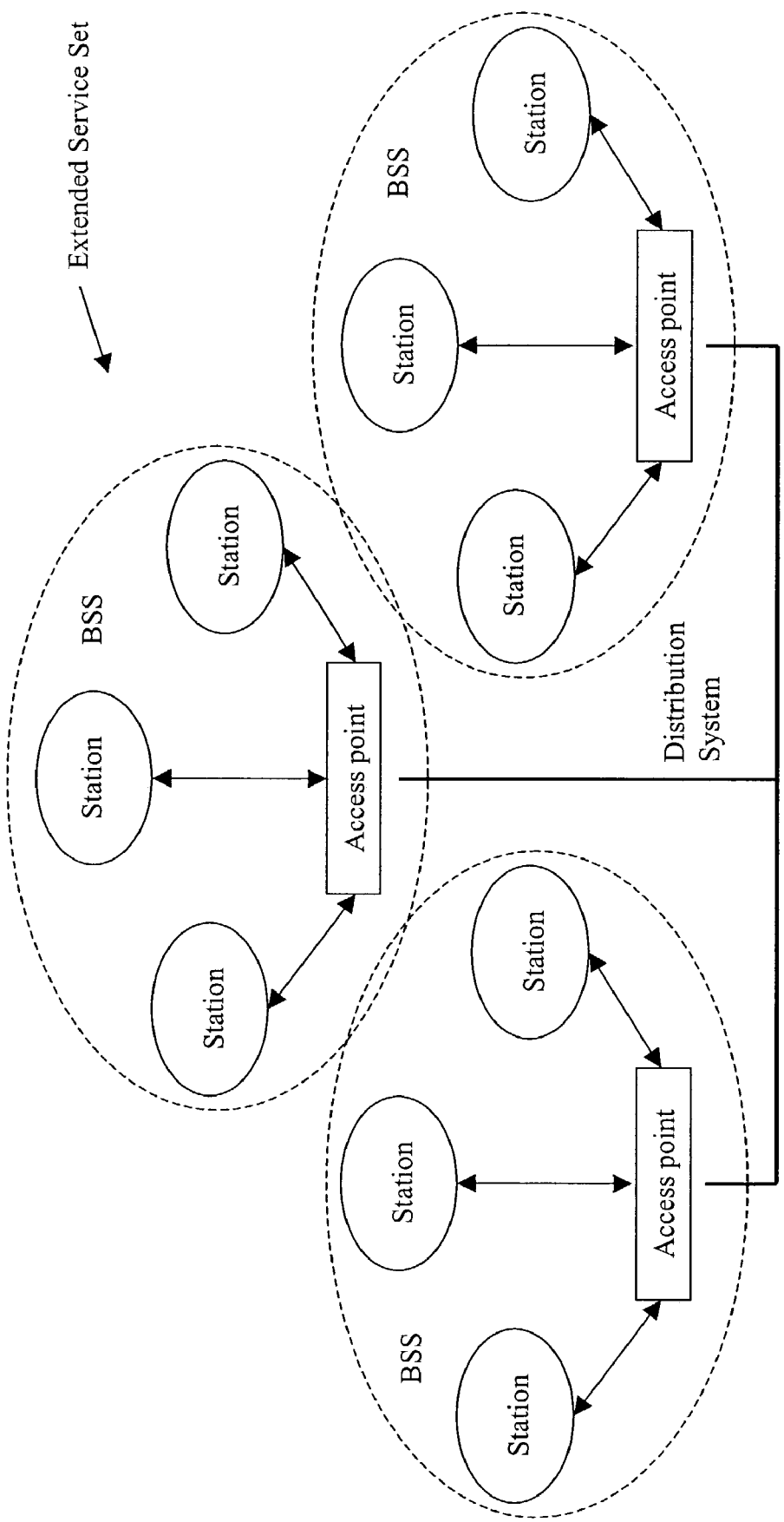
FIG. 2 shows an exemplary extended service set in a wireless local area network ("WLAN")

With reference to FIG. 2, an example of an extended service set, which forms a WLAN according to the IEEE 802.11 standard, is depicted having three basic service sets ("BSS"). Each BSS can include an access point ("AP") and one or more stations. A station is a component that can be used to connect to the WLAN, which can be mobile, portable, stationary, and the like, and can be referred to as the network adapter or network interface card. For instance, a station can be a laptop computer, a personal digital assistant, and the like. In addition, a station can support station services such as authentication, deauthentication, privacy, delivery of data, and the like.

Each station can communicate directly with an AP through an air link, such as by sending a radio or infrared signal between WLAN transmitters and receivers. Each AP can support station services, as described above, and can additionally support distribution services, such as association, disassociation, distribution, integration, and the like. Accordingly, an AP can communicate with one or more stations within its BSS, and with other APs through a medium, typically called a distribution system, which forms the backbone of the WLAN. This distribution system can include both wireless and wired connections.

Figure 3:
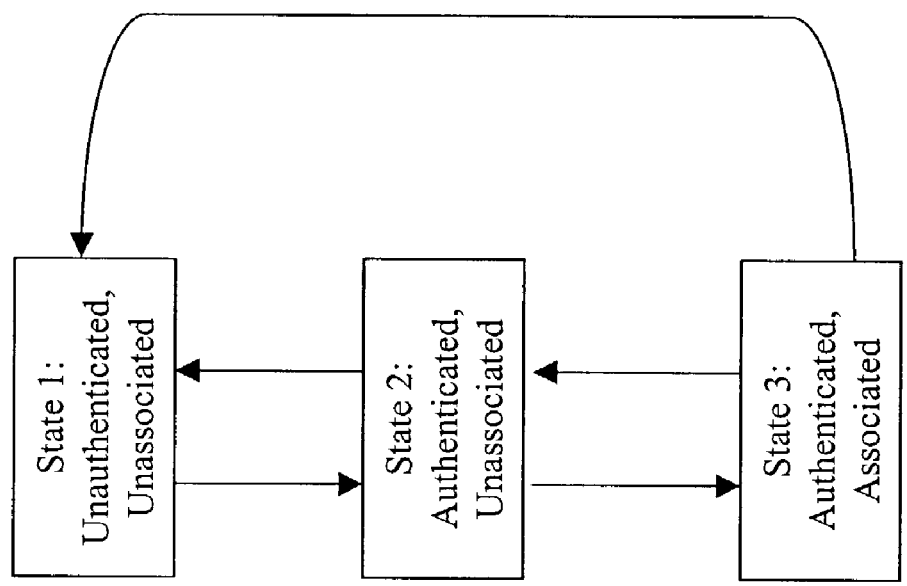
FIG. 3 is an exemplary flow diagram illustrating various states of stations in a WLAN.

With reference to FIGS. 2 and 3, under the current IEEE 802.11 standard, each station must be authenticated to and associated with an AP in order to become a part of a BSS and receive service from an AP. Accordingly, with reference to FIG. 3, a station begins in State 1, where the station is unauthenticated to and unassociated with an AP. In State 1, the station can only use a limited number of frame types, such as frame types that can allow the station to locate and authenticate to an AP, and the like.

If a station successfully authenticates to an AP, then the station can be elevated to State 2, where the station is authenticated to and unassociated with the AP. In State 2, the station can use a limited number of frame types, such as frame types that can allow the station to associate with an AP, and the like.

If a station then successfully associates or reassociates with an AP, then the station can be elevated to State 3, where the station is authenticated to and associated with the AP. In State 3, the station can use any frame types to communicate with the AP and other stations in the WLAN. If the station receives a disassociation notification, then the station can be transitioned to State 2. Furthermore, if the station then receives a deauthentication notification, then the station can be transitioned to State 1. Under the IEEE 802.11 standard, a station can be authenticated to different APs simultaneously, but can only be associated with one AP at any time.

With reference again to FIG. 2, once a station is authenticated to and associated with an AP, the station can communicate with another station in the WLAN. In particular, a station can send a message having a source address, a basic service set identification address ("BSSID"), and a destination address, to its associated AP. The AP can then distribute the message to the station specified as the destination address in the message. This destination address can specify a station in the same BSS, or in another BSS that is linked to the AP through the distribution system.

Although FIG. 2 depicts an extended service set having three BSSs, each of which include three stations, an extended service set can include any number of BSSs, which can include any number of stations.

As described above, according to the current IEEE 802.11 standard, a station is authenticated and associated with an AP to become a part of a BSS and thus obtain service. As also described above, the steps in the authentication and association process is categorized into 3 states (i.e., State 1, State 2, and State 3). Determining the state of a station can be desirable, particularly in analyzing problems that the station may be experiencing in obtaining service.

Figure 4:
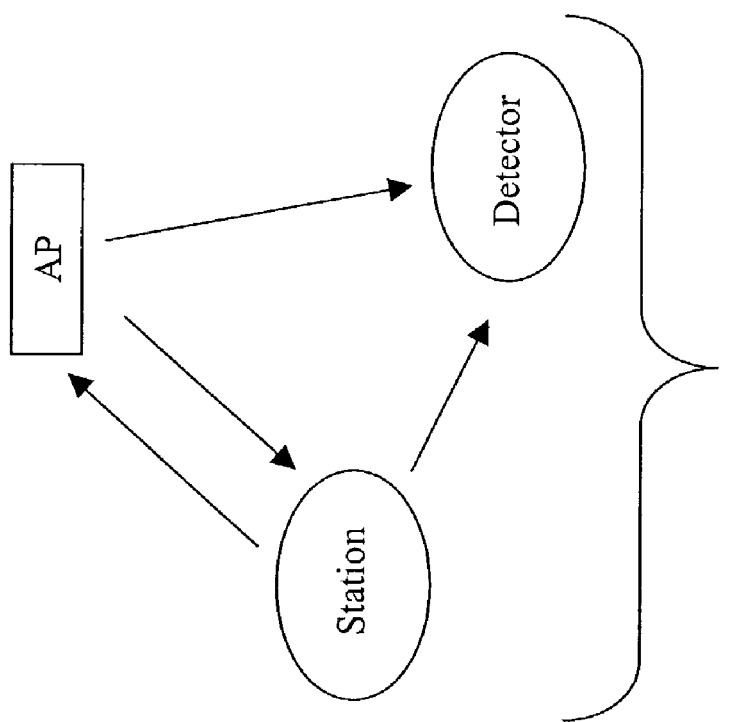
FIG. 4 shows an exemplary embodiment of an access point and a station exchanging transmissions.

For example, with reference to FIG. 4, assume that a station is having difficulty in obtaining service from an AP. Determining if the station is able to reach State 1, State 2, or State 3 can assist in trouble shooting the problem.

Thus, a detector can be located in the WLAN such that the detector can receive transmissions sent from and received by the station. Note that the detector need not necessarily be physically adjacent the station. Instead, the detector can be sufficiently near or adjacent the station such that the reception range of the detector covers the station.

By examining the transmissions sent from and received by the station, the detector can determine the state of the station. More particularly, different types of transmissions can be identified as being indicative of different states. For example, in the following table are different types of transmissions and the state that they indicate:

TABLE 1

| Type of Transmission | State |
| --- | --- |
| Probe Request Transmitted by Station | 1 |
| Probe Response Transmitted by AP | 1 |
| Authentication Request Transmitted by Station | 1 |
| Authentication Response w/ Challenge Text Transmitted by AP | 1 |
| Authentication Challenge Response Transmitted by Station | 1 |
| Authentication Final Response Transmitted by AP | 1 - on negative response 2 - on positive response |
| Deauthentication Transmitted by AP | 1 |
| Disassociation Transmitted by AP | 1 |
| Association Request Transmitted by Station | 2 |
| Association Response Transmitted by Station | 2 - on negative response 3 - on positive response |
| Higher Layer Protocol Data Transmitted by Station or AP | 3 |

Thus, when a transmission sent to or from the station is received, the detector examines the transmission to determine if the transmission is one of the types of transmissions listed above. If it is, then the detector can determine the state of the station that received or sent the transmission.

For example, if the detector receives a probe request frame sent by the station, then the detector can determine that the station is at State 1. If the detector receives a probe response frame sent by the AP to the station, then the detector can determine that the station is at State 1. If the station receives a data frame, which is a higher layer protocol data, sent by the station or received by the station, then the detector can determine that the station is at State 3.

The detector can also be configured to display the types of transmissions as a checklist. For example, the following checklist can be displayed:

TABLE 2

Beacon received by Station
Probe request sent by Station
Probe response received by Station
Auth. request sent by Station
Auth. challenge received by Station
Auth. challenge response received by Station
Auth. final response received by Station
Assoc. request sent by Station
Assoc. response received by Station
Data sent by Station
Data received by Station When one of the transmissions on the list is detected, then that type of transmission is marked. For example, if an authorization request sent by the station is received, the detector can "check off" the "Auth. request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

Figure 5:
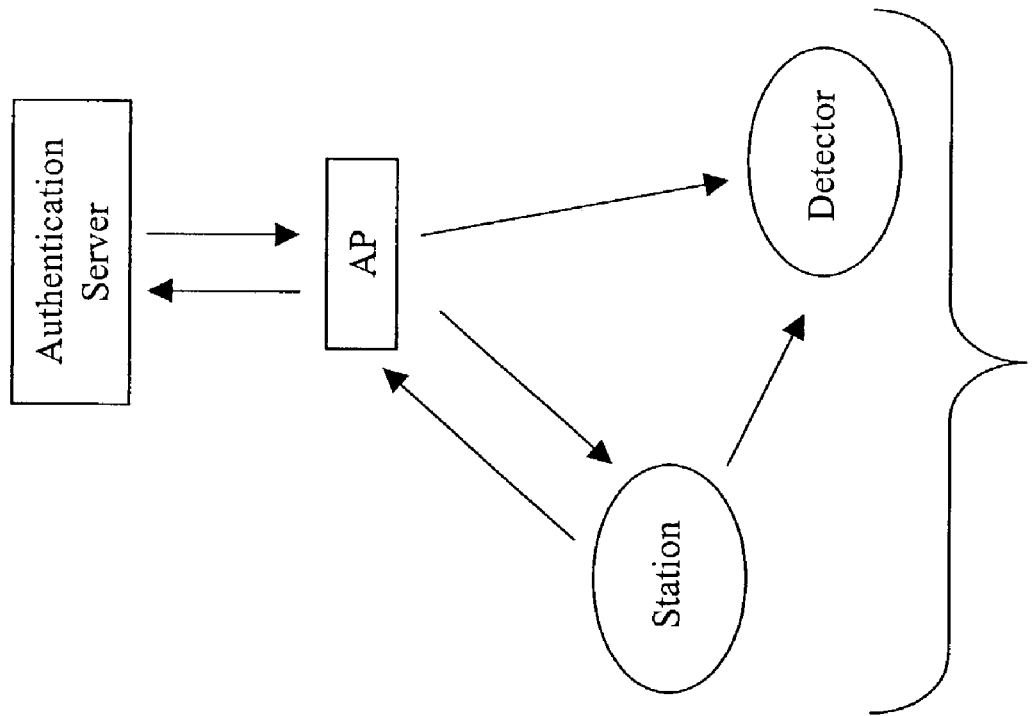
FIG. 5 shows another exemplary embodiment of an access point and a station exchanging transmissions.

With reference to FIG. 5, as described above, before a station can receive service from an AP, the station must be authenticated. In order to increase security, an authentication protocol can be implemented in a WLAN environment, such as the extensible authentication protocol over LANs (EAPOL) protocol in accordance with the IEEE 802.1x standard.

In accordance with the current EAPOL protocol, a station wanting to be authenticated, which is referred to as a supplicant, is authenticated using an authentication server, such as a remote authentication dial in user service (RADIUS) server. As depicted in FIG. 5, the station communicates with the AP, and the AP, which is referred to as the authenticator, communicates with the authentication server to authenticate the station.

During the authentication process, the station, AP, and authentication server exchange a number of transmissions. More specifically, in one exemplary mode of operation, the AP sends an "EAP-Request/Identity" transmission to the station. The station then sends an "EAP-Response/Identity" transmission to the AP. The AP then sends the received "EAP-Response/Identity" transmission to the authentication server. In response, the authentication server sends a challenge to the AP, such as with a token password system. The AP sends the challenge to the station as a credential request. The station sends a response to the credential request to the AP. The AP sends the response to the authentication server. If the response from the station is proper, the authentication server sends an "EAP-Success" transmission to the AP, which sends the package to the station. If the response is improper, the authentication server sends an "EAP-Failure" transmission to the AP, which sends the transmission to the station. It should be recognized that the number and types of transmissions exchanged between the station, AP, and authentication server can vary depending on the implemented mode of operation.

As described above, in one exemplary embodiment, a detector can be located in the WLAN such that the detector can receive transmissions sent from and received by the station. Again, note that the detector need not necessarily be physically adjacent the station. Instead, the detector can be sufficiently near the station such that the reception range of the detector covers the station.

By examining the transmissions sent from and received by the station, the detector can determine the state of the station. More specifically, the detector can receive the transmissions exchanged between the station and the AP during the authentication process described above in accordance with the EAPOL protocol. The detector can then determine the state of the station based on the received transmissions. More particularly, because the EAPOL transactions occur in state 3 as 802.11 data, the station can be determined as being in state 3.

Additionally, the detector can also be configured to display the types of transmissions as a checklist. For example, the following checklist can be displayed:

TABLE 3

802.1X initiated sent by Station
Identity request sent by Station
Identity response received by Station
Credential request sent by Station
Credential response received by Station TABLE 3-continued 802.1X authentication OK by Station
802.1X authentication failed by Station
De-authentication sent by Station
Data sent by Station
Data received by Station When one of the transmissions on the list is detected, then that type of transmission is marked. For example, if an "EAP-Request/Identity" package sent by the AP is received, the detector can "check off" the "Identity request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

To identify the transmissions sent from and received by the station, the detector obtains the MAC address of the station, which can be obtained from the source and destination address fields of the transmitted frames. The MAC address can also be obtained directly from the station. Alternatively, the MAC address of the station can be stored and retrieved from a table of MAC address assignments, which can be maintained by an administrator of the WLAN.

Additionally, if a particular AP that the station is attempting to communicate is known, the particular channel that the AP is operating on can then be monitored. If the station is attempting to communicate with multiple APs and the identity of those APs are known, then the particular channels that those APs are operating on can then be monitored.

Furthermore, the detector can scan the channels of the wireless local area network to receive transmissions sent from and received by the station with known or unknown APs. As described above, in the current implementation of the IEEE 802.11 standard, a total of 11 channels are used in the U.S., 13 channels are used in Europe, and 14 channels are used in Japan. For the sake of convenience, the following description will assume that the detector and the WLAN are located in the U.S. However, note that the detector can be configured to operate with any number of channels and in various countries.

In one configuration, the detector is configured to begin scanning by monitoring channel 1, then scan down each of the remaining 10 channels. If a station is having difficulty obtaining service, it will typically switch channels and repeat the association attempt therefore repeating the association failure scenario. A station can continuously cycle through the channels in an effort to obtain service. As such, the detector is configured to monitor a particular channel for a sufficient amount of time so that the station can complete one or more cycles. For example, the detector can be configured to monitor each channel for about 3 seconds.

If no transmissions are detected after scanning all of the channels, then the station is rebooted. As described above, a station can be configured to cycle repeatedly through the channels in an attempt to obtain service. However, a station can also be configured to only attempt one cycle and to stop after the last channel has been attempted. When the station is rebooted, it typically begins operating on channel 1. As such, by rebooting the station and monitoring on channel 1, a transmission sent to or received by the station can be detected. However, a station can take some time to reboot, typically a few seconds. As such, the detector is configured to monitor channel 1 for a longer duration than the other channels. For example, in one configuration, the detector is configured to monitor channel 1 for a period of 30 seconds.

As described above, the detector can scan the available channels in the WLAN. Alternatively, specific channels can be selected to be scanned. Although the detector scans the channels, it passively receives the transmissions, meaning that it does not broadcast signals on the WLAN. This has the advantage that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like.

Although the present invention has been described with respect to certain embodiments, examples, and applications, it will be apparent to those skilled in the art that various modifications and changes may be made without departing from the invention.

We claim:

1. A method of determining the state of a station in a wireless local area network, wherein the state of the station indicates whether the station has authenticated and/or associated with an access point in the wireless local area network, the method comprising:
   receiving transmissions exchanged between the station and the access point using a detector located adjacent to the station,
      wherein the transmissions are exchanged over the wireless local area network; and
   analyzing the received transmissions to determine the state of the station, wherein analyzing comprises
      examining a received transmission, and
      determining an indicative state of the station associated with the received transmission, wherein a first state of the station is associated with a first set of transmissions, and wherein determining comprises
         determining if the received transmission is one of the first set of transmissions, and identifying the state of the station as being the first state when the received transmission is determined to be one of the first set of transmissions.

2. The method of claim 1, wherein a second state of the station is associated with a second set of transmissions, and wherein determining comprises:
   determining if the received transmission is one of the second set of transmissions; and
   identifying the state of the station as being the second state when the received transmission is determined to be one of the second set of transmissions.

3. The method of claim 2, wherein a third state of the station is associated with a third set of transmissions, and wherein determining comprises:
   determining if the received transmission is one of the third set of transmissions; and
   identifying the state of the station as being the third state when the received transmission is determined to be one of the third set of transmissions.

4. The method of claim 3, wherein the first state indicates the station has not been authenticated or associated with the access point, the second state indicates that the station has authenticated but not associated with the access point, and the third state indicates that the station has authenticated and associated with the access point.

5. The method of claim 1, wherein the transmissions exchanged between the station and the access point comply with an extensible authentication protocol over local area networks (EAPOL) protocol.

6. A method of determining the state of a station in a wireless local area network, wherein the state of the station indicates whether the station has authenticated and/or associated with an access point in the wireless local area network, the method comprising:
   receiving transmissions exchanged between the station and the access point using a detector located adjacent to the station, wherein the transmissions are exchanged over the wireless local area network, wherein receiving comprises
      obtaining a medium access control (MAC) address of the station,
      receiving a transmission using the detector, wherein the transmission includes a source address and a destination address, and
      determining if the source address or the destination address of the transmission is the MAC address of the station; and
   analyzing the received transmissions to determine the state of the station.

7. A method of determining the state of a station in a wireless local area network, wherein the state of the station indicates whether the station has authenticated and/or associated with an access point in the wireless local area network, the method comprising:
   receiving transmissions exchanged between the station and the access point using a detector located adjacent to the station, wherein the transmissions are exchanged over the wireless local area network, wherein receiving comprises
      scanning a plurality of channels used in the wireless local area network using the detector, and
      rebooting the station if no transmissions are received during a scan of the plurality of channels; and
   analyzing the received transmissions to determine the state of the station.

8. The method of claim 7, wherein the station operates on a first channel after being rebooted, wherein the first channel is one of the plurality of channels used in the wireless local area network, and further comprising:
   scanning on the first channel using the detector for a longer period of time than other channels of the plurality of channels used in the wireless local area network.

9. A method of determining the state of a station in a wireless local area network, wherein the state of the station indicates whether the station has authenticated and/or associated with an access point in the wireless local area network, the method comprising:
   receiving transmissions exchanged between the station and the access point using a detector located adjacent to the station, wherein the transmissions are exchanged over the wireless local area network; and
   analyzing the received transmissions to determine the state of the station, wherein analyzing comprises
      displaying a list of transmissions on the detector, wherein the list includes different types of transmissions potentially exchanged between the station and the access point; and
      when a received message corresponds to one of the types of transmissions in the list of transmissions, indicating on the list of transmissions that the type of transmission corresponding to the received message was received.

10. The method of claim 9, wherein the types of transmissions include transmissions exchanged between the station and the access point during an authentication process in accordance with an extensible authentication protocol over local area networks (EAPOL) protocol.

11. A method of determining the state of a station in a wireless local area network, the method comprising:
receiving a transmission exchanged between the station and the access point using a detector located adjacent to the station, wherein the transmissions are exchanged over the wireless local area network;
displaying a list of transmissions on the detector, wherein the list includes different types of transmissions potentially exchanged between the station and the access point, and wherein the different types of transmissions are indicative of different states of the station;
determining if the received transmission is one of the different types of transmissions; and when a received transmission corresponds to one of the different types of transmissions, indicating on the list of transmissions that the type of transmission corresponding to the received transmission was received.

12. The method of claim 11, wherein the types of transmissions include transmissions exchanged between the station and the access point during an authentication process in accordance with an extensible authentication protocol over local area networks (EAPOL) protocol.

13. The method of claim 11, wherein a first type of transmissions is associated with a first state of the station, wherein the first state indicates the station has not been authenticated or associated with the access point.

14. The method of claim 13, wherein a second type of transmissions is associated with a second state of the station, wherein the second state indicates the station has authenticated but not associated with the access point.

15. The method of claim 14, wherein a third type of transmissions is associated with a third state of the station, wherein the third state indicates the station has authenticated and associated with the access point.

16. The method of claim 11, wherein receiving comprising:
scanning a plurality of channels used in the wireless local area network using the detector; and
rebooting the station if no transmissions are received during a scan of the plurality of channels.

17. The method of claim 16, wherein the station operates on a first channel after being rebooted, wherein the first channel is one of the plurality of channels used in the wireless local area network, and further comprising:
scanning on the first channel using the detector for a longer period of time than other channels of the plurality of channels used in the wireless local area network.

18. The method of claim 11 further comprising:
examining a received transmission; and
determining a state of the station associated with the received transmissions.

19. The method of claim 18, wherein a first state of the station is associated with a first set of transmissions, a second state of the station is associated with a second set of transmission, and a third state of the station is associated with a third set of transmissions, and wherein determining comprises:

determining if the received transmissions is one of the first, second, or third set of transmissions; and
identifying the state of the station as being the first, second, or third set when the received transmission is determined to be one of the first, second, or third set of transmissions, respectively.

20. An apparatus for determining the state of a station in a wireless local area network, wherein the state of the station indicates whether the station has authenticated and/or associated with an access point in the wireless local area network, the apparatus comprising:
a detector configured to:
receive transmissions exchanged between the station and the access point when the detector is located adjacent to the station; and
analyze the received transmissions to determine the state of the station, wherein a first state of the station is associated with a first set of transmissions, at least a second state of the station is associated with at least a second set of transmissions, and wherein the detector is configured to analyze the received transmissions by
determining if the received transmission is one of the first set or at least the second set of transmissions, and
identifying the state of the station as being the first state or the at least second state when the received transmission is determined to be one of the first set or the at least second set of transmissions.

21. The apparatus of claim 20, wherein the first state indicates the station has not been authenticated or associated with the access point, and wherein the at least second state indicates that the station has authenticated but not associated with the access point.

22. The apparatus of claim 21, wherein a third state of the station is associated with a third set of transmissions, wherein the third state indicates that the station has authenticated and associated with the access point, and wherein the detector is configured to analyze the received transmissions by:
determining if the received transmission is one of the third set of transmissions; and
identifying the state of the station as being the third state when the received transmission is determined to be one of the third set of transmissions.

23. The apparatus of claim 20, wherein the transmissions exchanged between the station and the access point comply with an extensible authentication protocol over local area networks (EAPOL) protocol.

24. The apparatus of claim 20, wherein the detector is configured to receive transmissions by: scanning a plurality of channels used in the wireless local area network, wherein the station is rebooted if no transmissions are received during a scan of the plurality of channels.

25. An apparatus for determining the state of a station in a wireless local area network, wherein the state of the station indicates whether the station has authenticated and/or associated with an access point in the wireless local area network, the apparatus comprising:
a detector configured to
receive transmissions exchanged between the station and the access point when the detector is located adjacent to the station, wherein the detector is configured to receive transmissions by: scanning a plurality of channels used in the wireless local area network, wherein the station is rebooted if no transmissions are received during a scan of the plurality of channels; and analyze the received transmissions to determine the state of the station, wherein the station operates on a first channel after being rebooted, wherein the first channel is one of the plurality of channels used in the wireless local area network, and wherein the detector is configured to scan the first channel for a longer period of time than other channels of the plurality of channels used in the wireless local area network.

26. An apparatus for determining the state of a station in a wireless local area network, wherein the state of the station indicates whether the station has authenticated and/or associated with an access point in the wireless local area network, the apparatus comprising:

a detector configured to:
receive transmissions exchanged between the station and the access point when the detector is located adjacent to the station; and
analyze the received transmissions to determine the state of the station, wherein the detector is configured to
display a list of transmissions, wherein the list includes different types of transmissions potentially exchanged between the station and the access point, and
when a received message corresponds to one of the types of transmissions in the list of transmissions, indicate on the list of transmissions that the type of transmission corresponding to the received message was received.

27. The apparatus of claim 26, wherein the types of transmissions include transmissions exchanged between the station and the access point during an authentication process in accordance with an extensible authentication protocol over local area networks (EAPOL) protocol.

28. A computer-readable storage medium containing computer executable code to determine the state of a station in a wireless local area network, wherein the state of the station indicates whether the station has authenticated and/or associated with an access point in the wireless local area network, by instructing a computer to operate as follows:

receiving transmissions exchanged between the station and the access point; and
analyzing the received transmissions to determine the state of the station, wherein a first state of the station is associated with a first set of transmissions, at least a second state of the station is associated with at least a second set of transmissions, and wherein analyzing comprises
determining if the received transmission is one of the first set or at least the second set of transmissions, and
identifying the state of the station as being the first state or the at least second state when the received transmission is determined to be one of the first set or the at least second set of transmissions.

29. The computer-readable storage medium of claim 28, wherein the first state indicates the station has not been authenticated or associated with the access point, and wherein the at least second state indicates that the station has authenticated but not associated with the access point.

30. The computer-readable storage medium of claim 29, wherein a third state of the station is associated with a third set of transmissions, wherein the third state indicates that the station has authenticated and associated with the access point, and wherein analyzing further comprises:

determining if the received transmission is one of the third set of transmissions; and
identifying the state of the station as being the third state when the received transmission is determined to be one of the third set of transmissions.

31. The computer-readable storage medium of claim 28, wherein the transmissions exchanged between the station and the access point comply with an extensible authentication protocol over local area networks (EAPOL) protocol.

32. The computer-readable storage medium of claim 28, wherein receiving comprises:

scanning a plurality of channels used in the wireless local area network, wherein the station is rebooted if no transmissions are received during a scan of the plurality of channels.

33. A computer-readable storage medium containing computer executable code to determine the state of a station in a wireless local area network, wherein the state of the station indicates whether the station has authenticated and/or associated with an access point in the wireless local area network, by instructing a computer to operate as follows:

receiving transmissions exchanged between the station and the access point, wherein receiving comprises scanning a plurality of channels used in the wireless local area network, wherein the station is rebooted if no transmissions are received during a scan of the plurality of channels; and analyzing the received transmissions to determine the state of the station, wherein the station operates on a first channel after being rebooted, wherein the first channel is one of the plurality of channels used in the wireless local area network, and wherein scanning comprises scanning the first channel for a longer period of time than other channels of the plurality of channels used in the wireless local area network.

34. A computer-readable storage medium containing computer executable code to determine the state of a station in a wireless local area network, wherein the state of the station indicates whether the station has authenticated and/or associated with an access point in the wireless local area network, by instructing a computer to operate as follows:

receiving transmissions exchanged between the station and the access point; and
analyzing the received transmissions to determine the state of the station, wherein analyzing comprises
displaying a list of transmissions, wherein the list includes different types of transmissions potentially exchanged between the station and the access point, and
when a received message corresponds to one of the types of transmissions in the list of transmissions, indicating on the list of transmissions that the type of transmission corresponding to the received message was received.

35. The computer-readable storage medium of claim 34, wherein the types of transmissions include transmissions exchanged between the station and the access point during an authentication process in accordance with an extensible authentication protocol over local area networks (EAPOL) protocol.

* * * * *